(12) United States Patent
Butzmann

(10) Patent No.: US 9,035,613 B2
(45) Date of Patent: May 19, 2015

(54) PARALLEL CIRCUIT OF ACCUMULATOR LINES

(75) Inventor: Stefan Butzmann, Beilstein (DE)

(73) Assignee: ROBERT BOSCH GmbH, Stuttgart (DE)

( * ) Notice: Subject to any disclaimer, the term of this patent is extended or adjusted under 35 U.S.C. 154(b) by 581 days.

(21) Appl. No.: 13/391,867

(22) PCT Filed: Jul. 5, 2010

(86) PCT No.: PCT/EP2010/059526
§ 371 (c)(1),
(2), (4) Date: May 2, 2012

(87) PCT Pub. No.: WO2011/023436
PCT Pub. Date: Mar. 3, 2011

(65) Prior Publication Data
US 2012/0206103 A1    Aug. 16, 2012

(30) Foreign Application Priority Data
Aug. 28, 2009 (DE) .................. 10 2009 028 972

(51) Int. Cl.
*H02J 7/00* (2006.01)
*B60L 11/18* (2006.01)

(52) U.S. Cl.
CPC ......... *B60L 11/1853* (2013.01); *B60L 11/1855* (2013.01); *B60L 11/1864* (2013.01); *Y02T 10/7005* (2013.01); *Y02T 10/7061* (2013.01)

(58) Field of Classification Search
CPC ............ B60L 11/1853; B60L 11/1855; B60L 11/1864
USPC ........................................... 320/126
See application file for complete search history.

(56) References Cited

U.S. PATENT DOCUMENTS

| 2004/0026140 | A1* | 2/2004 | Suzuki et al. | 180/65.2 |
| 2004/0135544 | A1* | 7/2004 | King et al. | 320/116 |
| 2006/0220601 | A1* | 10/2006 | Horii | 318/139 |
| 2009/0261658 | A1* | 10/2009 | Kato | 307/82 |

FOREIGN PATENT DOCUMENTS

| JP | 11-332023 | 11/1999 |
| JP | 2003-32901 | 1/2003 |
| JP | 2006-109612 | 4/2006 |
| JP | 2006-318818 | 11/2006 |
| JP | 2006-333662 | 12/2006 |
| JP | 2007-236197 | 9/2007 |
| JP | 2008-218272 | 9/2008 |
| JP | 2009-89536 | 4/2009 |
| JP | 2009-201266 | 9/2009 |
| WO | 2009 096 073 | 8/2009 |

* cited by examiner

*Primary Examiner* — Nha Nguyen
(74) *Attorney, Agent, or Firm* — Kenyon & Kenyon LLP

(57) ABSTRACT

A circuit for connecting a first accumulator line to a second accumulator line from an accumulator is described. The accumulator is provided for charging and discharging electrical energy via the accumulator lines. Each accumulator line has a positive pole and a negative pole for charging and discharging electrical energy. The circuit has at least one first switch which is provided for disconnecting and connecting two similar poles of the two accumulator lines.

5 Claims, 1 Drawing Sheet

PARALLEL CIRCUIT OF ACCUMULATOR LINES

FIELD OF THE INVENTION

The present invention relates to a circuit for connecting a first accumulator line to a second accumulator line from an accumulator, an accumulator for charging and discharging electrical energy via a DC link capacitor and a vehicle electrical system for supplying electrical consumers in a motor vehicle with electrical energy from an accumulator.

BACKGROUND INFORMATION

It may be expected that, in the future, for stationary applications, such as wind power plants, as well as in vehicles, such as hybrid or electric vehicles, new accumulator systems will be increasingly used which will be subjected to very high demands with respect to their reliability. The backdrop of these high demands is that a failure of the accumulator may result in a failure of the entire system. For example, a traction battery failure in an electric vehicle results in a so-called "car breakdown." This may even result in safety problems. For example, accumulators are used in wind power plants, in order to protect the plant from improper operating conditions during strong winds by readjusting the rotor blades.

For providing high energies and outputs, multiple accumulator lines 64, 66 are also switched in parallel to one another. The schematic circuit diagram of such an accumulator 40 is shown in FIG. 2.

In order to be able to disconnect accumulator 40 from an electrical consumer, e.g., a vehicle electrical system, two power switches, such as contactors 42, 44, are typically provided. When switching on the two contactors 42, 44, a substantial current 46 would, however, flow into DC link capacitor 48, so that a so-called precharging contactor 50, 52 and main contactor 54, 56, which is attached to the other accumulator pole, are initially switched on. Precharging contactor 50, 52 usually has a protective resistor 58, 60. As a result, DC link capacitor 48 is initially charged with a delimited current 46. As soon as voltage 62 at DC link capacitor 48 is sufficiently high, main contactor 42, 44 is switched on. Conventionally, such a circuit 63 is used for both accumulator lines 64, 66 independently from one another.

However, the costs of the circuit breakers in main contactors 42, 44, 54, 56 are very high. Furthermore, it appears that when both precharging contactors 50, 52, or a main contactor 54, 56 and a precharging contactor 50, 52, which is associated with the other accumulator line, are switched on simultaneously, a compensating current, which is converted at precharging resistors 58, 60 into lost heat, flows via precharging contactors 50, 52 and the associated resistors 58, 60 between the two accumulator lines 64, 66.

SUMMARY OF THE INVENTION

An object of the present invention is therefore to provide a circuit for connecting at least two accumulator lines in one accumulator, with the aid of which costs and electric losses in the accumulator may be reduced.

The present invention thus provides a circuit for parallel-connecting a first accumulator line to a second accumulator line from one accumulator. The accumulator is provided for charging and discharging electrical energy via the accumulator lines. Each accumulator line has a positive pole and a negative pole for charging and discharging electrical energy. According to the present invention, the circuit has at least one first switch which is provided for disconnecting and connecting two similar poles of the two accumulator lines. With the aid of the circuit according to the present invention, the individual accumulator lines are switched in parallel to one another and may be connected as one entity via one single conventional protective device to a DC link capacitor or to another electrical consumer. The decisive advantage is that now all the accumulator lines may be disconnected from and connected to the electrical consumer simultaneously with the aid of the only protective device, so that no compensating currents may occur between the individual accumulator lines. Consequently, the electric losses in an accumulator in which the accumulator lines are connected using the circuit according to the present invention are reduced. Moreover, the positive poles or negative poles of the individual accumulator lines have a uniform electric potential with respect to one another during their parallel connection, which is why no large current flows are to be expected through the switch. This allows the switch in the circuit to be cost-effectively selected according to the present invention without its need of being resistant to a substantial electrical power flow.

The further descriptions herein detail and describe refinements of the present invention.

According to one alternative embodiment of the present invention, the circuit may have a second switch for disconnecting and connecting the remaining similar poles of the accumulator lines.

In one refinement of the present invention, the circuit may be provided for simultaneously switching the first and the second switches.

In one alternative or additional refinement of the present invention, the circuit may have a bidirectional switching converter for charge balancing between the positive pole and the negative pole of the first and the second accumulator lines. This switching converter allows the individual accumulator lines to be kept in a separated state on a uniform voltage level, so that the individual accumulator lines may even be connected via the circuit according to the present invention in an almost de-energized manner.

In one exemplary embodiment, the bidirectional switching converter may be a bidirectional flyback converter.

The exemplary embodiments and/or exemplary methods of the present invention also provide an accumulator for charging and discharging electrical energy via an electrical consumer having an input capacitance, the accumulator having a first and a second accumulator line. Each accumulator line has a positive pole and a negative pole for charging and discharging electrical energy. The two accumulator lines are connected in parallel to each other via a circuit according to the present invention.

In one refinement of the exemplary embodiments and/or exemplary methods of the present invention, the accumulator may have a protective switching device between the parallel-switched accumulator lines and the electrical consumer for disconnecting the electrical connection to the electrical consumer. This protective switching device allows the accumulator to be electrically separated from the consumer and the closed-circuit currents to be reduced.

In one specific embodiment, the protective switching device may have a precharging device for delimiting the charging current to the electrical consumer. This prevents short-circuits and thus high current flows via the electrical consumer.

In one refinement of the exemplary embodiments and/or exemplary methods of the present invention, the accumulator may be provided initially for opening the protective switching device and subsequently for opening at least the first switch in the circuit, when the electrical connection to the electrical consumer is disconnected. In this way, it is ensured that the individual accumulator lines prevail on the same voltage level when the parallel circuit is opened, so that opening of the parallel circuit may take place in a de-energized manner.

The exemplary embodiments and/or exemplary methods of the present invention also provide a vehicle electrical system for supplying the electrical consumers in a motor vehicle with electrical energy from an accumulator according to the present invention.

The exemplary embodiments and/or exemplary methods of the present invention also provide a method for connecting at least two accumulator lines to a DC link capacitor. For this purpose, a DC link capacitor is initially charged via the first accumulator line and a charging circuit. Subsequently, the second accumulator line (8) is connected in parallel to the first accumulator line (6).

In one exemplary embodiment, the charging circuit may be short-circuited following the parallel connection of the two accumulator lines. In this way, the charging circuit may be used to connect the two accumulator lines.

Alternatively or additionally, a voltage level may be balanced between the accumulator lines prior to the parallel connection, whereby the two accumulator lines may be connected to one another in a wattles manner.

Unrestricted exemplary embodiments of the present invention are described in detail below with reference to the attached drawings.

DETAILED DESCRIPTION

Specific embodiments of the present invention are described in detail below with reference to the figures.

Figure 1:
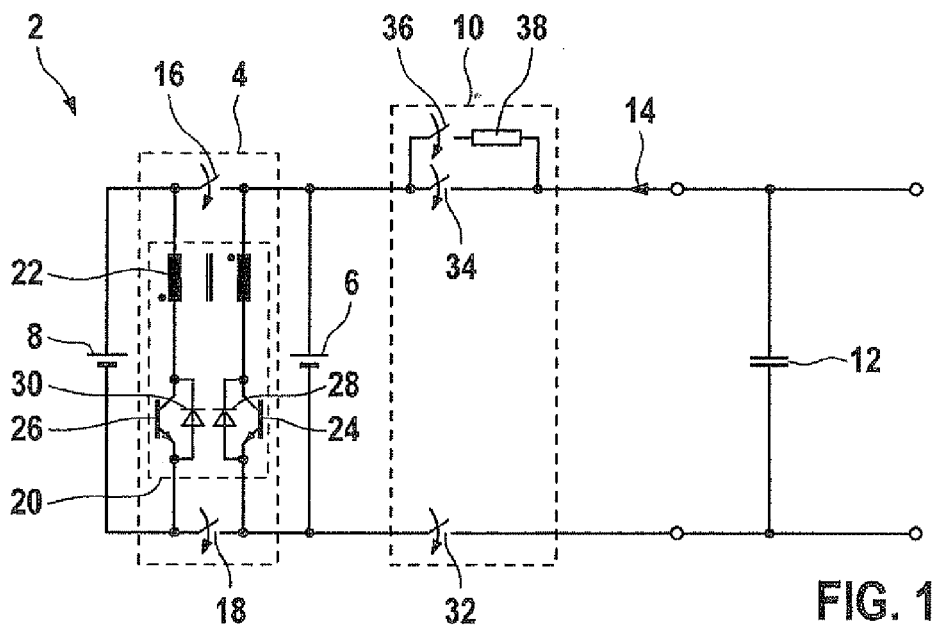
FIG. 1 shows an accumulator system according to the present invention having two accumulator lines.
Figure 2:
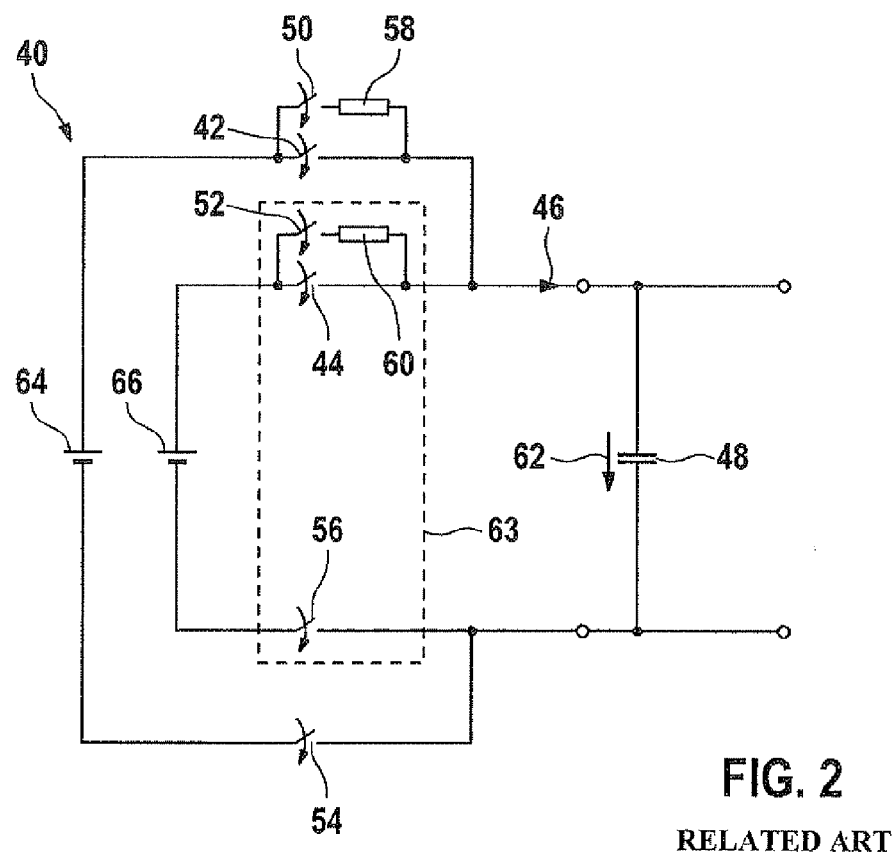
FIG. 2 shows a conventional accumulator system having two accumulator lines.

FIG. 1 shows a schematic circuit diagram of an accumulator 2 with an exemplary embodiment of a circuit 4 according to the present invention.

In accumulator 2, a first accumulator line 6 is connected in parallel to a second accumulator line 8 via circuit 4 according to the present invention. Furthermore, a DC link capacitor 12 as the electrical consumer having an input capacitance is connected in parallel to first accumulator line 6 via a protective circuit 10. Thus, an electric current 14 may be charged and discharged by accumulator 2 via DC link capacitor 12.

Circuit 4 according to the present invention has a first switch 16 and a second switch 18 in order to disconnect and connect the parallel connection between the two accumulator lines 6, 8. For the two accumulator lines 6, 8 to have a uniform voltage level in a separated state, a bidirectional switching converter in the form of a bidirectional flyback converter 20 is further provided in circuit 4 according to the present invention. Flyback converter 20 has a transformer 22 and two transistors 24, 26 as switches. Between the emitter and collector of the two transistors 24, 26, a freewheeling diode 28, 30 is switched for protection against inductive loads. Flyback converter 20 shown in FIG. 1 is indicated only schematically. Components for activating the two transistors 24, 26 are missing, for example. However, since the configuration of a bidirectional flyback converter 20 is known, it is not explained in greater detail for the sake of clarity.

Protective circuit 10 has a first power switch 32, a second power switch 34, a third power switch 36 and a protective resistor 38. Parallel-switched accumulator lines 6, 8 may be connected to DC link capacitor 12 via first and second power switches 32, 34. Since DC link capacitor 12 poses a very small resistance for accumulator 2 when completely discharged, DC link capacitor 12 is initially charged not via second power switch 34 but via third power switch 36 and protective resistor 38, so that current 14 to DC link capacitor 12 is delimited, and accumulator lines 6, 8 of accumulator 2 are not inadmissibly loaded.

Accumulator lines 6, 8 may be connected in different ways. For example, the two accumulator lines 6, 8 may initially be connected in parallel to one another. The entire parallel circuit may then be connected to DC link capacitor 12 via protective circuit 10, as described previously. However, first accumulator line 6 may be initially connected to DC link capacitor 12 via protective circuit 10. As soon as DC link capacitor 12 is fully charged, second accumulator line 8 is connected to first accumulator line 6 by closing switches 16, 18.

The two accumulator lines 6, 8 are kept at a uniform voltage level with the aid of bidirectional flyback converter 20. As a result, connecting of the two accumulator lines 6, 8 to DC link capacitor 12 via shared protective circuit 10 may be improved. If first accumulator line 6 is initially connected to DC link capacitor 12 via shared protective circuit 10, bidirectional flyback converter 20 keeps the two accumulator lines 6, 8 on a uniform voltage level even in a separated state, so that the two accumulator lines may now be connected to one another in a de-energized manner, and an additional protective circuit may be dispensed with when connecting second accumulator line 8.

Flyback converter 20 could also be dispensed with during connection. Third power switch 36 could, for example, remain closed and second power switch 34 remain open until all parallel accumulator lines 6, 8 are connected to DC link capacitor 12.

For disconnecting the two accumulator lines 6, 8 from DC link capacitor 12, first and second power switches 32, 34 in protective circuit 10 are initially opened before the two switches 16, 18 are opened in circuit 4 according to the present invention. Due to the uniform voltage level during disconnection and subsequent reconnection, there are hardly any leakage currents between the two accumulator lines 6, 8.

According to the exemplary embodiments and/or exemplary methods of the present invention, the uniform voltage level of two parallel-connected accumulator lines is used to disconnect—with few losses—an accumulator from an electrical consumer having an input capacitance as a load such as a DC link capacitor. The uniform voltage level also allows cost-effective switches to be used for disconnecting the accumulator lines among one another because the switches are not exposed to high electric currents.

In addition to the above disclosure, reference is explicitly made to the disclosure of the figures.

What is claimed is:

1. An accumulator for charging and discharging electrical energy via an electrical consumer having an input capacitance, comprising:
   a first accumulator line and a second accumulator line, each of which have a positive pole and a negative pole for charging and discharging the electrical energy;
   a connecting circuit connected in parallel to, and between, the first and second accumulator lines for parallel-connecting the first accumulator line to the second accumulator line, the connecting circuit including: at least one first switch for disconnecting and connecting the positive poles of the two accumulator lines, at least one second switch for disconnecting and connecting the negative poles of the two accumulator lines, and a bidirectional flyback converter including a transformer; and a protective switching device positioned between the parallel-connected accumulator lines and the electrical consumer for selectively connecting and disconnecting the electrical consumer to the parallel-connected accumulator lines, wherein the protective switching device includes: a third switch for selectively connecting and disconnecting the positive pole of the electrical consumer from the positive poles of the two accumulator lines, and a fourth switch for selectively connecting and disconnecting the negative pole of the electrical consumer from the negative poles of the two accumulator lines.

2. The accumulator of claim 1, wherein the protective switching device has a precharging device for delimiting the charging current to the electrical consumer.

3. A method for connecting at least two accumulator lines to a DC link capacitor, the method comprising:

connecting a first accumulator line to the DC link capacitor via a protective switching device;

charging the DC link capacitor via the first accumulator line and a charging circuit; and parallel-connecting a second accumulator line to the first accumulator line by an intervening connecting circuit provided in parallel to, and between, the first and second accumulator lines, wherein the connecting circuit includes a first switch, a second switch, and a bidirectional flyback converter including a transformer, and wherein the parallel connection of the first and second accumulator lines is achieved by connecting the positive poles of the two accumulator lines by the first switch and connecting the negative poles of the two accumulator lines by the second switch.

4. The method of claim 3, further comprising:

short-circuiting the charging circuit following the parallel-connection of the two accumulator lines.

5. The method of claim 3, further comprising:

balancing, by the bidirectional flyback converter, a voltage level between the accumulator lines prior to the parallel connection.

* * * * *